(12) United States Patent
Bauer et al.

(10) Patent No.: US 6,808,234 B2
(45) Date of Patent: Oct. 26, 2004

(54) SEAT

(75) Inventors: Jurgen Bauer, Sulzbach (DE); Mauro Rossi, Obersontheim (DE)

(73) Assignee: Recaro Aircraft Seating GmbH & Co., Schwäbisch Hall (DE)

( * ) Notice: Subject to any disclaimer, the term of this patent is extended or adjusted under 35 U.S.C. 154(b) by 0 days.

(21) Appl. No.: 10/468,269

(22) PCT Filed: Jul. 31, 2002

(86) PCT No.: PCT/EP02/08514
§ 371 (c)(1),
(2), (4) Date: Aug. 19, 2003

(87) PCT Pub. No.: WO03/013904
PCT Pub. Date: Feb. 20, 2003

(65) Prior Publication Data
US 2004/0066076 A1 Apr. 8, 2004

(30) Foreign Application Priority Data
Aug. 8, 2001 (DE) .......................... 101 38 926

(51) Int. Cl.[7] ............................................... B60N 2/02
(52) U.S. Cl. ........................... 297/354.12; 297/354.13; 297/216.1; 297/411.3; 297/78; 297/411.36
(58) Field of Search ..................... 297/411.36, 411.35, 297/411.3, 411.33, 354.12, 354.13, 216.1, 216.2, 216.15, 78, 216.14

(56) References Cited
U.S. PATENT DOCUMENTS

| | | | | |
|---|---|---|---|---|
| 2,085,836 A | * | 7/1937 | Tatum | 297/411.39 |
| 2,173,283 A | * | 9/1939 | Lorenz et al. | 297/82 |
| 3,596,983 A | * | 8/1971 | Ramillon | 297/78 |
| 4,440,441 A | * | 4/1984 | Marrujo et al. | 297/216.2 |
| 4,492,407 A | * | 1/1985 | Broadhead | 297/78 |
| 4,703,974 A | * | 11/1987 | Brauning | 297/285 |
| 4,968,095 A |   | 11/1990 | Moyer | |
| 5,110,180 A | * | 5/1992 | Schneider | 297/78 |
| 5,224,755 A | * | 7/1993 | Beroth | 297/216.1 |
| 5,730,492 A | * | 3/1998 | Warrick et al. | 297/216.2 |
| 6,715,836 B1 | * | 4/2004 | Chen et al. | 297/411.39 |

FOREIGN PATENT DOCUMENTS

| | | |
|---|---|---|
| DE | 3814758 | 11/1989 |
| DE | 4310454 | 10/1994 |
| DE | 19542198 | 5/1997 |
| DE | 19612287 | 6/1997 |
| DE | 19724763 | 12/1998 |

* cited by examiner

Primary Examiner—Peter M. Cuomo
Assistant Examiner—Erika Garrett
(74) Attorney, Agent, or Firm—Roylance, Abrams, Berdo & Goodman L.L.P.

(57) ABSTRACT

The invention relates to a seat, especially a vehicle seat, and preferably an air passenger seat, comprising a seat element and a seat element carrier (12), a backrest (10) which can be adjusted in terms of the incline thereof, and at least one armrest (14), said armrest being pivotably joined to the backrest (10). The armrest (14) is continuously moved with the increasing or decreasing incline of the backrest (10) by means of an adjustment mechanism (20), said adjustment mechanism (20) for the armrest (14) comprising at least four articulation points (22, 24, 26, 28). A parallelogram articulation of the armrest is thus achieved by which means said armrest can lower itself. The aim of the invention is to be able to practically bring the backrest into a horizontal position in which the so-called parallelogram geometrically follows a fictitious line in an average incline position of the backrest, the four articulation points of the parallelogram lying on one line. To this end, a critical dead center position is easily overcome in that a control part forms a type of auxiliary parallelogram with its other articulation points (44, 46).

7 Claims, 4 Drawing Sheets

SEAT

Figure 1:
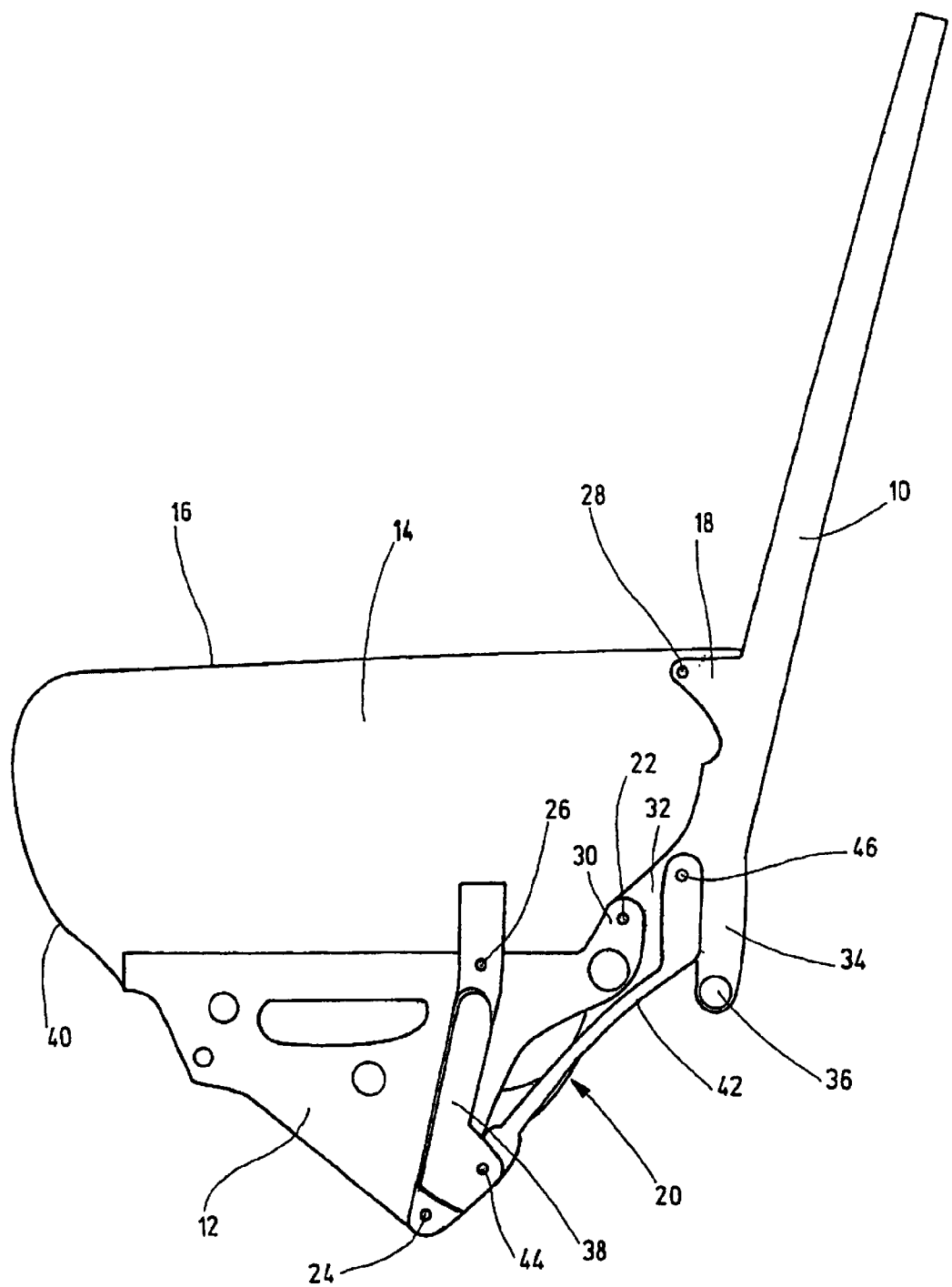

The invention relates to a seat, particularly a vehicle seat, and preferably an aircraft passenger seat, with a seat element and a seat element support, a backrest whose tilt angle can be adjusted, and at least one armrest, whereby said armrest is mounted in such a way as to swivel at the backrest, whereby, as the tilt angle of the backrest increases or decreases, the armrest is continuously carried along with it by an adjustment mechanism, and whereby the adjustment mechanism for the armrest has at least four articulation points, of which one is located in the seat element support and the other in a connecting-rod part and, of the other two articulation points, one moves together with the connecting-rod part and the other with the backrest.

DE 197 24 763 A1 discloses a vehicle seat, especially an aircraft passenger seat, with a tilt-adjustment device, by means of which the backrest is able to swivel around a swivel axis relative to the seat element. Owing to the fact that the position of the swivel axis is moved by a lever drive from an area between the backrest and the seat element in such a way that the swivel axis is located at the level of the seat occupant's hips, relative movement between the backrest, on the one hand, and the seat occupant's back, on the other, is avoided, so that the so-called shirt-ride-up effect cannot arise when the backrest is tilted to the rear. The vehicle seat designed for this purpose has a high degree of seating comfort; however, the armrests on both sides of the seat are kept in an essentially horizontal position, which adversely affects the seat occupant's seating comfort, especially when the backrest is tilted far back. Accordingly, it would be desirable to make it possible to adjust the armrests as well.

The state of the art provides suggestions for how to adjust the armrest or arm support. Thus, for example, DE 196 12 287 C1 relates to a seat device, especially a therapy seat with a seat surface and a backrest whose tilt angle can be adjusted. Moreover, the disclosed seat has at least one armrest that consists of an upper support part and a lower guide part, whereby the support part can swivel around a horizontal axis that is located on one side of the backrest and is detachably attached to this axis. Moreover, the guide part of the armrest can slide along a fixed guide and in this connection is designed in such a form that, when it swivels around the axis, the support part executes a translational motion that is determined by the involute shape of the guide part. Owing to this forced mechanical connection, during the entire time that the seat-back tilt angle is being adjusted, the arm support of the corresponding armrest is in a horizontal, continuously lowering position that occurs when moving from a sitting to a reclining position. If, however, the backrest is not completely in the horizontal position, a seat occupant finds it uncomfortable to have to keep his arms in a horizontal position on the arm supports when the backrest is partially tilted to the rear.

Similar considerations also apply to the arm supports described in DE 43 10 454 C1 and DE 195 42 198 A1, in which the arm support can be shifted from an unused position to a position of use by means of swiveling parallelogram guide rods, whereby in the position of use the arm support can be moved up and down in an essentially horizontal position regardless of the tilt angle of the backrest.

DE 38 14 758 A1 discloses a vehicle seat with a seat element, whereby the lateral spars of a backrest are flexibly connected to the frame of a seat element by means of a swivel axis. With the known approach, above the swivel axis each seat lateral spar has a pivot above the swivel axis, where an armrest is rotatably mounted that is connected to a guide rod attached to the seat element, forming a parallelogram-shaped support. In this way, regardless of the tilt angle of the backrest, the arm support is held in a position parallel to the seat element, whereby, when the backrest moves as the angle of tilt is adjusted, the armrest is carried with it to the rear as it descends, thereby hampering the occupant's ability to rest his arms on a support. Moreover, the known approach requires a large number of connecting rods that are controlled by a rotating armature; this disclosed approach results in a heavy structure, and therefore to date it has been successfully implemented only in motor vehicles.

On the basis of this state of the art the object of the invention is to develop a seat, especially an aircraft passenger seat, that meets even elevated comfort requirements, especially for cases where the backrest is in a partially tilted-back position that is located between an upright seat position and a reclined position that is, if possible, largely horizontal. Moreover, the desired solution should be compact and lightweight. A seat with the features of claim 1 in its entirety accomplishes this object.

In that, as specified in the characterizing part of claim 1, the one articulation point of the connecting-rod part that is fixed with regard to the seat element support and the other movable articulation point are located respectively at the opposite ends of the connecting-rod part, in that the movable articulation point of the connecting-rod part forms a guide for the armrest, in that in the area of the fixed articulation point of the connecting-rod part a control part catches it with its one free end and with the fifth articulation point, in that the control part catches the backrest with its other free end by means of another, sixth articulation point, and in that, with the backrest adjusted to any tilted position, the sixth articulation point, by means of which the armrest is swivel-connected to the backrest, remains below the fourth articulation point, a parallelogram-shaped guide for the armrest is provided, whereby it can be lowered on its own, and, if the backrest is to be moved to a virtually completely reclined position in which the above-mentioned parallelogram geometrically follows an imaginary line when the backrest is tilted halfway to the rear by virtue of the fact that the four articulation points of the parallelogram lie on the same line, an appropriate critical dead-center position is easily overcome by virtue of the fact that the control part with its other articulation points forms a kind of auxiliary parallelogram which, with the first parallelogram in the above-mentioned dead-center position with its four articulation points, stays in the "tensioned" position.

In addition to unhampered operation, the armrest retains its position relative to the tilting motion of the backrest viewed more or less in the longitudinal direction and tilts appreciably only when the backrest is tilted further back, so that the entire armrest area continues to remain available to a seat occupant even in the reclined position. Because of the small number of components required, the approach according to the invention is cost-effective and light in weight, which is of particular importance in aviation in connection with controlling fuel costs. Since, in addition, the essential parts of the adjustment parallelogram are located in the area of the seat element support, there are no mechanical components of an adjustment device in the area of the seat element or the backrest; particularly in the event of a crash, this provides for enhanced safety since the seat occupant cannot be injured by such mechanical components.

It is preferable that provision is made such that, with the backrest in the upright position, the arm support of the armrest is essentially horizontal or is tilted only slightly from the horizontal and that, with the backrest tilted all the way to the rear, the arm support is essentially parallel to the backrest. Thus, even when the aircraft passenger seat is in the reclined or berthed position, it is possible for the seat occupant to hold his arms in a relaxed position; in this case, in keeping with improved seating comfort, the occupant's arms are essentially in the same plane as his torso.

Other advantageous embodiments are features of the other dependent claims.

Below, the seat according to the invention is explained in greater detail using a sample embodiment in the nature of an aircraft passenger seat.

Here, in diagrammatic form, not to scale:

FIGS. 1–4 present, in a side view, the essential components of the aircraft passenger seat with its adjustment mechanism, whereby the armrest facing the viewer has been omitted from the drawing and thus the adjustment mechanism behind it is visible, along with the other armrest. Moreover, to ensure better visibility, the upholstery for the backrest and the seat element has been eliminated from the drawing, including any actuators and other means of adjusting the seat to the extent that the adjustment motion of the armrest was not affected.

Figure 4:
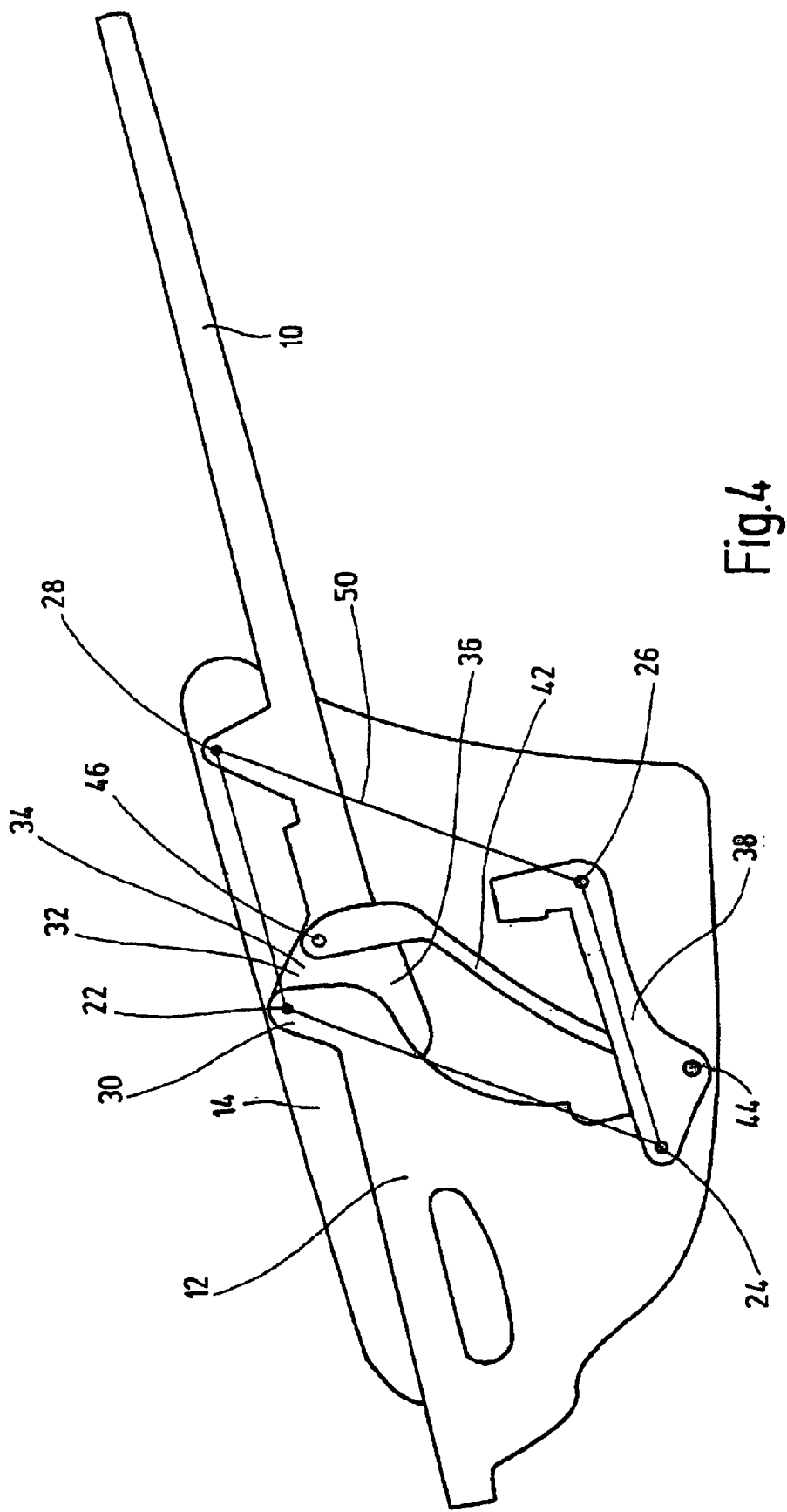

FIG. 1 shows the aircraft passenger seat in its upright position, where the backrest 10 is tilted only slightly to the rear. In addition, the seat element, in the form of the seat element support 12, shown, is essentially horizontal, and in the horizontal direction the corresponding armrest 14 with its arm support 16 is tilted slightly forward toward the edge of the seat. With its right-hand upper end, as is to be seen in the line of sight to FIG. 1, the armrest 14 is swivel-attached to a projection 18 of the backrest 10 in its lower area. And as FIGS. 1–4 in particular show, an adjustment mechanism, which is designated as a whole as 20, ensures that, as the backrest 10 is tilted to a greater or lesser extent, the armrest 14 is continually brought along with it. If the backrest 10 moves into its fully reclined position as shown in FIG. 4, the adjustment mechanism 20 ensures that the arm support 16 lies essentially parallel to the backrest 10 in question with its upholstery, not shown, and at the same time is accordingly tilted slightly downward toward the cabin floor.

Said adjustment mechanism 20 initially has four articulation points 22, 24, 26, and 28. The first articulation point 22, as seen in the line of sight of the figures, is located at an upward-projecting extension 30 at a rear upper end of the seat element support 12. Said first articulation point 22 accordingly forms a first swivel axis, which the lower end of the backrest 10 catches with a fork end 32 of a fork end piece 34. The other fork end 36 of the fork end piece 34 catches an actuator, not shown, in the form of, for example, a pneumatic or hydraulic working cylinder or an electromechanical actuating drive which, when activated, can be used to adjust the tilt of the backrest 10 and thus, by way of the adjustment mechanism 20, necessarily controls the motion of the other seat components such as seat element support 12 and armrest 14.

The second articulation point 20 is located at the lower end of the longitudinally movable seat element support 12 and thus forms a fixed swivel axis which the lower end of a connecting-rod part 38 catches. In the area of the other free end of the connecting-rod part 38 is the third articulation point 26, whereby the corresponding swivel axis engages with the armrest 14 and thus forms another guide for the corresponding armrest, not shown, that faces toward the observer. Since in its forward and lower areas the armrest 14 is designed in the shape of an arc, the corresponding arc-shaped line 40 can additionally or alternatively be part of another guide that is otherwise formed by an inside rail, not shown, of the seat element support 12.

Moreover, in the area of the third articulation point 26, an actuator (not shown) can catch that initiates the motion of the adjustment mechanism 20 and thus makes it possible to adjust the angle of tilt of the components. Said actuator can supplement or replace the actuator that is connected to the fork end piece 34 of the backrest 10. The fourth articulation point 28 is formed by the point where the armrest 14 is coupled to the backrest 10 with its projection 18. In order to be able to follow the adjustment of the tilt angle of the backrest 10, the seat element support 12 can be swiveled around the fixed axis in the form of the second articulation point 24.

With its lower free end and by means of a fifth articulation point 44, a control part 42 in the form of a control rod catches in the area of the fixed articulation point 24 of the connecting-rod part 38 and between the two free ends thereof. With its other free end, the control part 42 in turn catches the backrest 12, specifically in the area of the fork end piece 34, and consequently in a lower area of the backrest 10 between the first articulation point 22 and the fourth articulation point 28. Said catching takes place by means of a sixth articulation point 46. As FIGS. 1–4 in their entirety show, here, regardless of the angle to which the tilt of the backrest 10 is adjusted, the sixth articulation point 46 remains below the fourth articulation point 28, by means of which the armrest 14 is swivel-connected to the backrest 10 in the rear area.

Figure 2:
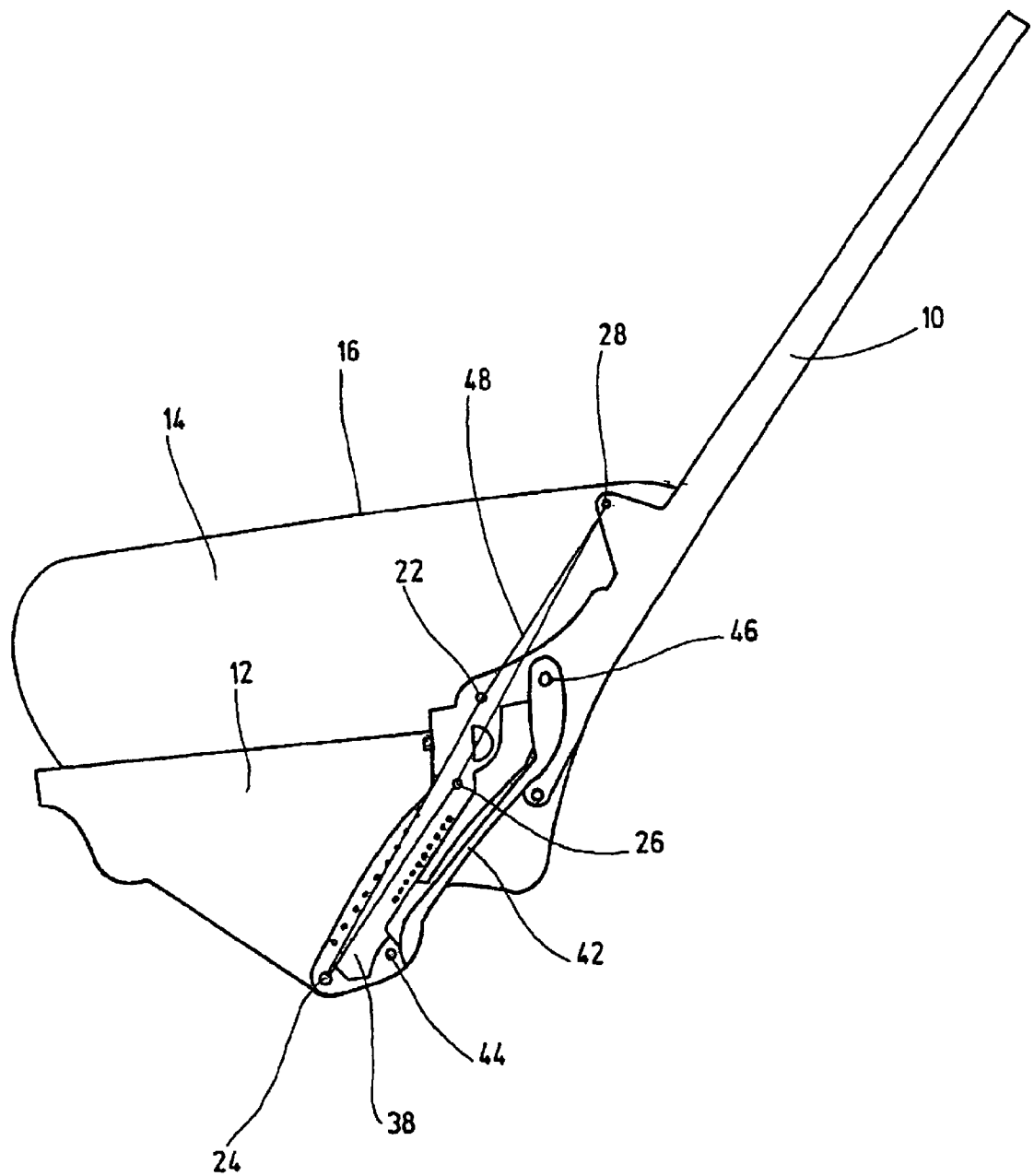
Figure 3:
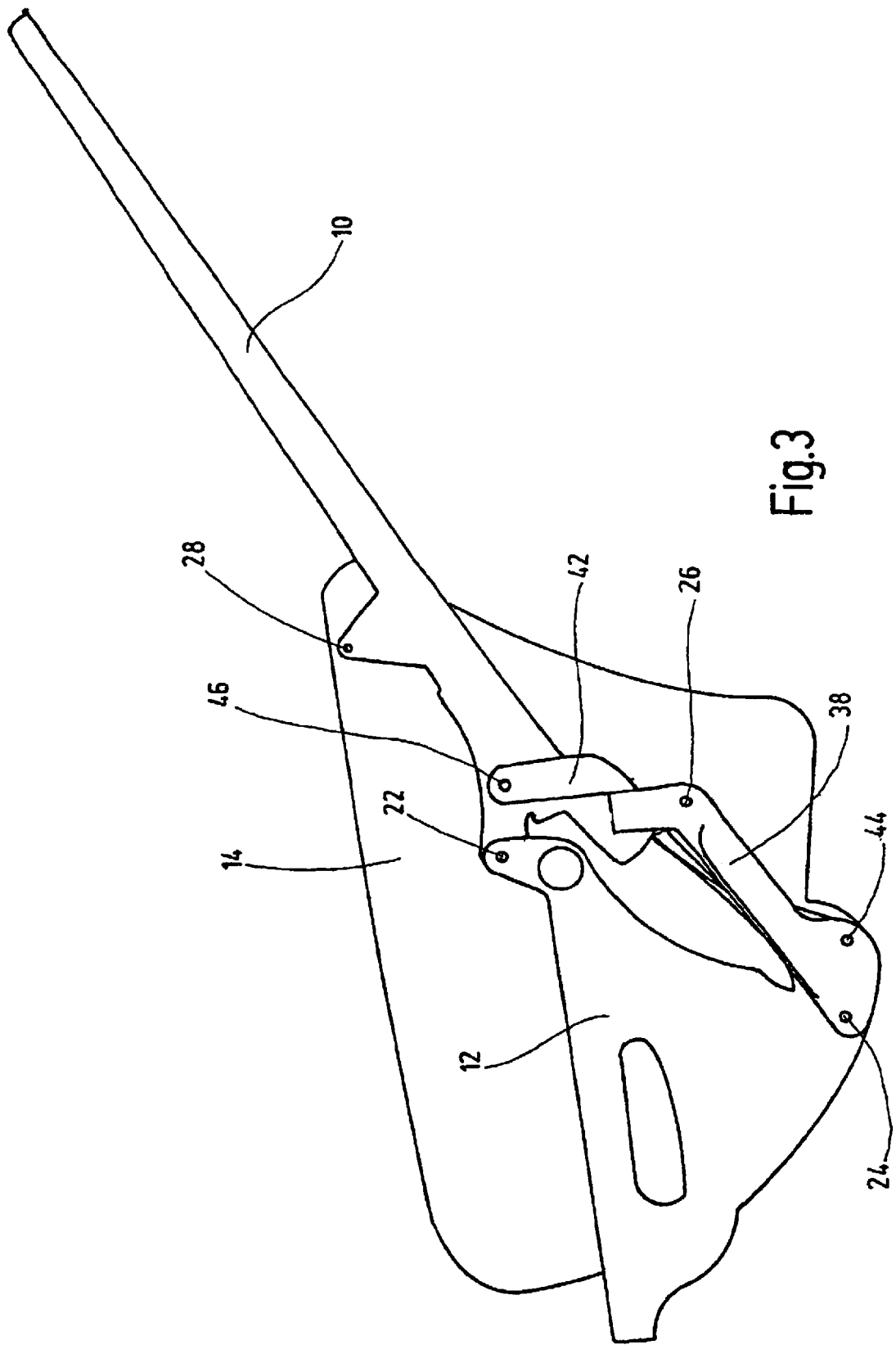

As the depiction in FIG. 2 in particular indicates, when the backrest 10 is adjusted at a tilt angle between its upright position (FIG. 1) and its fully reclined position (FIG. 4), the four articulation points 22, 24, 26, 28 are located more or less along a common line 48 or inside of an overlap area whose width can be set in advance by the rail 48, whereby the control part 42 with its sixth articulation point 46 remains outside of this line guide 48 and/or this area. The corresponding tilt adjustment situation as indicated in FIG. 2 corresponds to a certain dead-center point of the adjustment mechanism that can cause self-inhibition in the adjustment of the angle of tilt and, because of the forced coupling by way of the rod-like control part 42, it is possible to overcome this area in order to move the backrest 10 into, for example, an upright position as shown in FIG. 2.

In the opposite case, i.e., when backrest 10 is tilted far to the rear, as shown in FIG. 4, the four articulation points 22, 24, 26, 28 clamp an imaginary parallelogram 50, in which the control part 42 engages with its upper free end and at the same time with the sixth articulation point 46 while overcoming the dead-center behavior. In this way reliable, appropriate, obstacle-free activation is possible with the aircraft passenger seat adjusted to any tilt position by way of the control part 42. Since, as FIG. 4 indicates in particular, with the aircraft passenger seat in a reclined or berthed position, all essential components such as backrest 10, seat element support 12 with the seat element (not shown), and the corresponding arm support 16 of the corresponding armrest 14 can assume coordinated tilt and height adjustment positions, a high degree of seating comfort is achieved, and even long-distance flights can thus be handled by a seat occupant easily and in an ergonomically favorable manner. In this connection it is possible to ensure that leg and foot rests, not shown, emulate the angles to which the other seat components are tilted so that an optimum resting position for the seat occupant is thus achieved in the leg area as well.

Based on the design implementation of its features, the above-described aircraft passenger seat can also easily be used in vehicles, for example, in vehicle ferries, tour buses, etc. Another possible application is in the area of medical therapy chairs, for example, in the form of an operating chair or table for dental treatment methods. If implemented in modular fashion, the approach of the invention makes it possible to quickly remove the armrest and replace it with a new or different armrest since the corresponding exchange process is not hampered by the mechanism and also the armrest has only a single point where it is connected to the backrest.

What is claimed is:

1. A seat, especially a vehicle seat, and preferably an aircraft passenger seat, with a seat element and a seat element support (12), a backrest (10) whose tilt angle can be adjusted, and at least one armrest (14), whereby said armrest (14) is swivel-connected to the backrest (10), whereby, as the tilt angle of the backrest (10) is increased or decreased, the armrest (14) is continuously carried along with it by means of the adjustment mechanism (20), whereby the adjustment mechanism (20) for the armrest (14) has at least four articulation points (22, 24, 26, 28), of which two (22, 24) are located with one at the seat element support (12) and one at a connecting-rod part (38), and one of the other two articulation points (26, 28) can move together with the connecting-rod part (38) and the other (28) can move with the backrest (10), characterized in that one articulation point (24) of the control-rod part (38), which is fixed with respect to the seat element support (12), and the other movable articulation point (26) are located respectively at opposite ends of the connecting-rod part (38), wherein the movable articulation point (26) of the connecting-rod part (38) forms a guide for the armrest (14), wherein in the area of the fixed articulation point (24) of the connecting-rod part (38) a control part (42) catches it with its one free end and by means of a fifth articulation point (44), wherein the control part (42) catches the backrest (10) with its other free end by means of another, sixth articulation point (46), and wherein, with the backrest (10) adjusted to any angle of tilt, the sixth articulation point (46) remains below the fourth articulation point (28), by which the armrest (14) is swivel-connected to the backrest (10).

2. The seat as claimed in claim 1, wherein, with the backrest (10) in the upright position, the arm support (16) of the armrest (14) is essentially horizontal or is slightly tilted forward and wherein, with the backrest (10) fully reclined, the arm support (16) is essentially parallel to the backrest (10).

3. The seat as claimed in claim 1, wherein, when the backrest (10) is tilted between its upright and fully reclined positions, the four articulation points (22, 24, 26, 28) are located essentially along a common line (48) or in an overlap area whose width can be set in advance and wherein the control part (42) remains outside of this line and/or this area.

4. The seat as claimed in claim 1, wherein, as the tilt angle of the backrest (10) increases, the four articulation points (22, 24, 26, 28) clamp an imaginary parallelogram (50) in which the control part (42) engages at least partially with the sixth articulation point (46), by means of which the control part (42) is attached to a lower end part of the backrest (10).

5. The seat as claimed in claim 1, wherein the lower end part of the backrest (10) ends in a fork end piece (34), in which one of the articulation points (22) of the adjustment mechanism (20) is located and which the free end of the control part (42) catches by means of the sixth articulation point (46).

6. The seat as claimed in claim 1, wherein the seat element support (12) follows the adjusted tilt angle of the backrest (10) and armrest (14) by means of the adjustment mechanism (20) and wherein the seat element support (12) at least partially forms a guide for the motion of the armrest (14).

7. The seat as claimed in claim 5, wherein at least one actuator for operating the adjustment mechanism (20) catches the backrest (10) and/or the lower part (38).

\* \* \* \* \*